(12) United States Patent
Bisiach (10) Patent No.: US 8,201,312 B2
(45) Date of Patent: Jun. 19, 2012

(54) WORKING EQUIPMENT AND METHOD FOR WORKING A STRUCTURE

(75) Inventor: Bruno Bisiach, Venaria (IT)

(73) Assignee: Bisiach & Carru S.p.A., Venaria Reale (IT)

( * ) Notice: Subject to any disclaimer, the term of this patent is extended or adjusted under 35 U.S.C. 154(b) by 1251 days.

(21) Appl. No.: 11/882,506

(22) Filed: Aug. 2, 2007

(65) Prior Publication Data

US 2008/0209712 A1 Sep. 4, 2008

(51) Int. Cl.
*B23P 13/00* (2006.01)
*B23P 23/00* (2006.01)
*B23B 47/00* (2006.01)
*B23B 49/00* (2006.01)

(52) U.S. Cl. ............ 29/407.05; 29/407.08; 29/557; 29/559; 29/33 K; 408/97

(58) Field of Classification Search ............ 29/897.2, 29/407.05, 407.08, 524.1, 525.06, 557, 559, 29/33 K; 73/37.6; 408/67, 97
See application file for complete search history.

(56) References Cited

U.S. PATENT DOCUMENTS

| 4,310,964 A | | 1/1982 | Murphy |
| 4,955,119 A | | 9/1990 | Bonomi et al. |
| 4,995,148 A | | 2/1991 | Bonomi et al. |
| 5,774,968 A | * | 7/1998 | Givler ................. 29/243.54 |
| 5,848,859 A | | 12/1998 | Clark et al. |
| 6,011,482 A | | 1/2000 | Banks et al. |
| 6,088,897 A | * | 7/2000 | Banks et al. ............. 29/243.53 |
| 6,098,260 A | * | 8/2000 | Sarh ...................... 29/243.53 |
| 6,427,312 B1 | * | 8/2002 | Kubanek et al. .......... 29/525.06 |
| 6,523,245 B2 | * | 2/2003 | Whiten et al. ............ 29/524.1 |
| 6,772,508 B2 | * | 8/2004 | Bloch et al. ................ 29/709 |
| 6,979,288 B2 | * | 12/2005 | Hazlehurst et al. ........ 483/1 |
| 2005/0172481 A1 | * | 8/2005 | Herrmann et al. ........ 29/715 |

FOREIGN PATENT DOCUMENTS

| EP | 0 082 811 A1 | 6/1983 |
| IT | TO2002A000030 | 7/2003 |
| IT | TO2006A000518 | 1/2008 |
| JP | 63-016910 A | 1/1988 |

OTHER PUBLICATIONS

European Search Report for EP07113479, dated Apr. 30, 2008.

* cited by examiner

*Primary Examiner* — Jermie Cozart
(74) *Attorney, Agent, or Firm* — Sughrue Mion, PLLC (57) ABSTRACT

A working equipment comprising an external working head and an internal working head both arranged for applying a thrust on a structure having a wall. The wall comprises an external side and an internal side opposite to said external side. The thrust is opposite to the thrust applied to a same part by the other of the internal and external working head. The external working head is provided with a pressure device comprising a slide which holds a piston head comprising a supporting plate, an intermediate plate and a fixed base. The supporting plate is attached to the intermediate plate and the intermediate plate is attached to the fixed base. The supporting plate has a tool passage opening. The suction chamber is arranged inside the intermediate plate and inside the fixed base.

34 Claims, 9 Drawing Sheets

WORKING EQUIPMENT AND METHOD FOR WORKING A STRUCTURE

FIELD OF INVENTION

The present invention relates to a device and to a method for working work pieces such as shell structures. More particularly, the device and the method according to the invention can be used for manufacturing fuselage sections or other aircraft parts.

TECHNICAL FIELD

For manufacturing light-weight fuselages or wings of an aircraft, it is currently known to use panels of very thin aluminium, or shell structures made of composite materials (FIG. 2), and to reinforce them with reinforcement ribs to be applied later, usually called "frames" in the technical field. These added reinforcements can be made, for example, of aluminium or titanium alloys.

According to known techniques, the cross-sections of such added reinforcements that can have various shapes, such as T- or inverted J-shape; such added reinforcements are fixed to the aluminium panels with rivets, if provided with a suitable lip or, according to more recent techniques, laser-welded.

Riveting is currently the preferred technology, since it is well-proven and less critical than welding.

Figure 1:
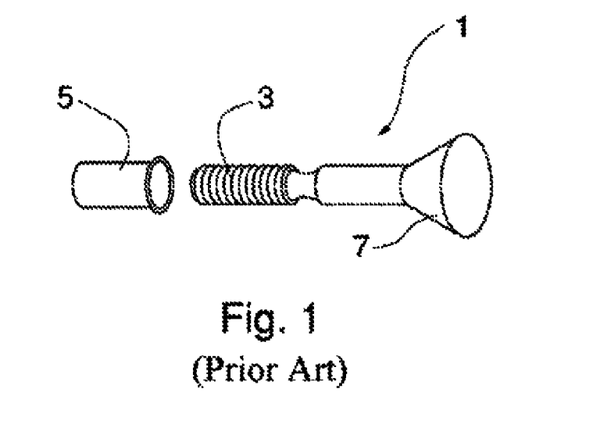
FIG. 1 shows an example of a known rivet, for the riveting a shell structure according to an embodiment of a method according to the present invention.

FIG. 1 shows a known type of a stud or rivet 1, used in the aeronautical field for riveting added reinforcements. The use of this type of rivet requires the following main steps:
- drilling the two parts that need to be joined (typically the wall to which the added reinforcement rib needs to be joined, and the added rib itself);
- injecting glue into the hole;
- inserting the rivet into the hole, and riveting.

While performing these steps, in order to avoid that undesirable turbulence arises, it is desired that the head of the rivet head 7 protrudes by the least possible distance from the panel's external wall or shell structure on which the added rib is riveted. For this purpose, efforts are made to make the beveled edges, of the rivet hole on the panel or on the shell structure that will receive the rivet's conic head 7, with very close working tolerances, possibly near zero. Another manufacturing technique used is keeping well packed and pressed together the added reinforcement rib and the panel, or the shell structure, so as to avoid that chips penetrate into the gaps which could be between the joining surfaces of the added reinforcement rib and of the panel or shell structure during the drilling. The problem related to the penetration of the drilling chips is particularly critical when riveting panels or shell structures of composite material, the drilling chips of which are particularly small and penetrating.

A third known technique used during the working is selecting rivets having the most suitable length depending on the thickness of each pack made up of either the added reinforcement plus the panel or the added reinforcement rib plus the shell structure.

A known system for riveting automatically the reinforcement ribs on aluminium structural panels is disclosed in the Italian patent application No. TO2002A000030 of Nov. 1, 2002.

Another system for riveting automatically the added reinforcement ribs on tubular shell structures of composite material, in order to make fuselage sections (also called "barrels" or "barrel" using an Anglo-Saxon technical term), is disclosed in the Italian patent application No. TO2006A000518 of Jul. 14, 2006.

An object of the present invention is providing a riveting system particularly suitable for, but not necessarily limited to, riveting added reinforcement ribs on panels or shell structures, with greater precision than the known riveting methods.

SUMMARY OF THE INVENTION

The above described objections are achieved by various embodiments of the inventions as recited in the claims and described herein.

The advantages achievable with the present invention will appear more evident, to a technician in the field, by the following detailed description of some non-limiting embodiments, provided with reference to the attached schematic drawings.

DETAIL DESCRIPTION OF THE PREFERRED EMBODIMENTS

Figure 2:
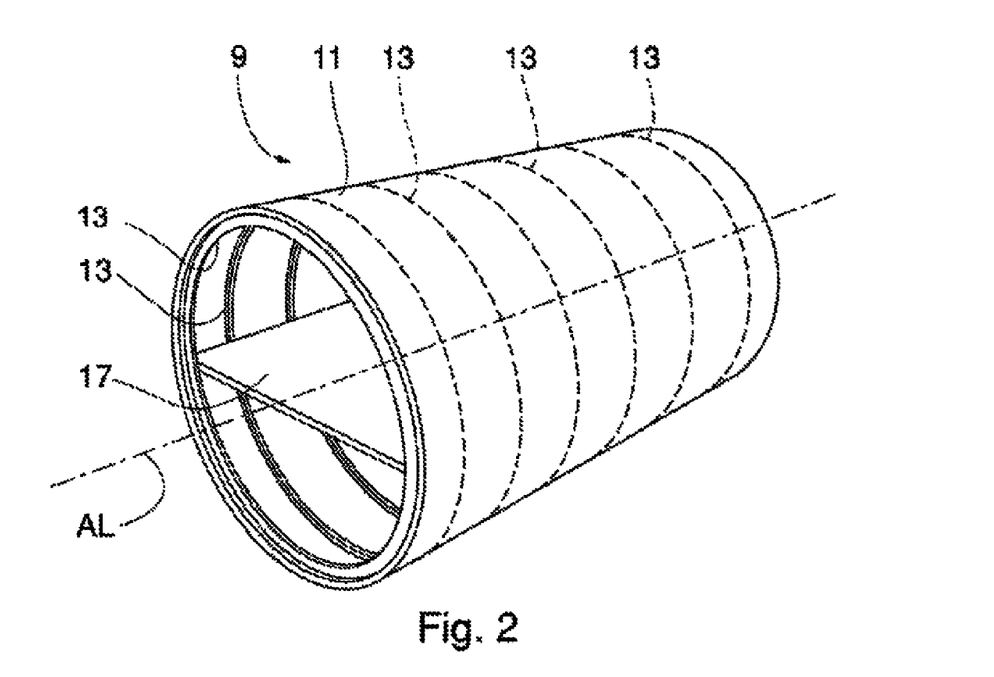
FIG. 2 shows a perspective view of an example of a "barrel" which is a section of an aircraft's fuselage and has a structure mostly made of composite materials, and having a substantially cylindrical shape.

FIG. 1 is an example of a known stud or rivet 1, used in the aeronautical field for riveting added reinforcement ribs to panels or shell structures, while FIG. 2 shows an example of a fuselage section 9 ("barrel") manufactured by riveting a plurality of aluminium or titanium added ribs—also referred to as added reinforcement ribs 13—on a tubular shell structure 11 of composite material, for example carbon fibers buried in a synthetic resin.

The added reinforcement ribs 13 or "frames" of the assembled "barrel" form a series of rings laying on planes perpendicular to the axis AL of the cylindrical shell structure 11. Reference 17 of FIG. 2 indicates the floor of the "barrel" 9.

The coupling walls of the added reinforcement rib 13 and of the shell structure 11 are drilled; the stem of the rivet 1 is inserted in the drilled hole and the locking bush 5 is fitted on the threaded portion of the rivet's stem, so as to protrude from the surface of the added reinforcement.

Subsequently a tool, as described later in more details, grasps the threaded portion 3 of the rivet and pulls it until it is stripped, and at the same time drives the bushing on the rivet stem so as to lock and fasten permanently together the coupling walls of the added reinforcement rib 13 and the external shell structure 11.

Figure 3:
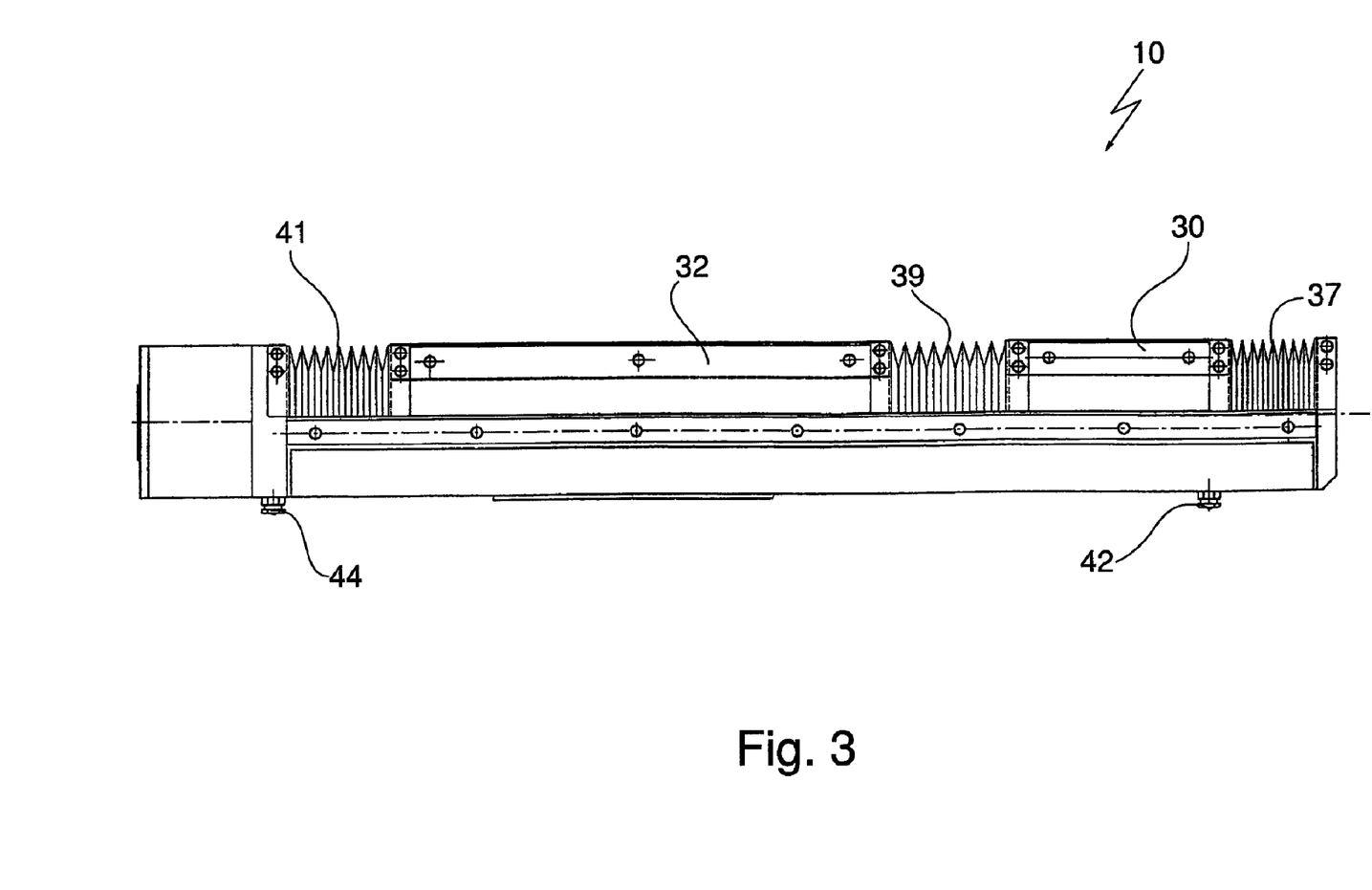
FIG. 3 shows a perspective view of a multiple riveting head according to an embodiment of the present invention.

FIG. 3 shows a multiple head riveting device, indicated with the overall reference 21, according to an embodiment of the present invention.

The working head 21 comprises a rotating platform 23 and a pressure device 25.

The rotating platform 23 comprises in its turn a base plate 27 on which a drilling device 29—also referred to as "drilling head 29" in this description—, a thickness measuring device 31, two adhesive applicators 33A, 33B and two rivet positioning devices 35A, 35B, are arranged in a radial pattern.

The pressure device 25 comprises a slide 37 which holds the piston head 39. The slide 37 can be, for example, of the kind described in the Italian patent application No. TO2002A000030 and, in the embodiments of FIG. 3, 4, is mounted at the end of a telescopic arm 38; in other embodiments not shown, the slide 37 can be mounted on the wrist of an anthropomorphic robot or on other kinds of mechanical arms.

The rotating platform 23 is mounted on the slide 37 and is able to rotate around itself, around the AR axis perpendicular—or more generally transversal—to the plane on which the devices 29, 31, 33B, 35A, 35B lie.

The references XYZ shown in FIG. 3 indicates the set of three Cartesian axes integral with the rotating platform 23, wherein the Z axis is parallel to the rotation axis AR and the X axis is parallel to the drilling axis of the device. References HKW indicate a set of three Cartesian axes integral with the slide 37, wherein the H axis is parallel to the moving longitudinal and displacement direction of the slide 37, while the W axis is parallel to the rotation axis AR.

The slide 37 is arranged for driving the piston head 39 and bringing it near to or away from the rotation axis AR with a displacement parallel to the axis H. The functioning of the slide 37 and of the piston head 39 will be explained in further details later.

On the drilling device a video camera—not shown—is mounted for recording images of the drilling area, which is otherwise not easily accessible and visible. In the present embodiment of the invention, video camera images are transmitted to a remote control station where an operator monitors the correct execution of the drilling.

Figure 4:
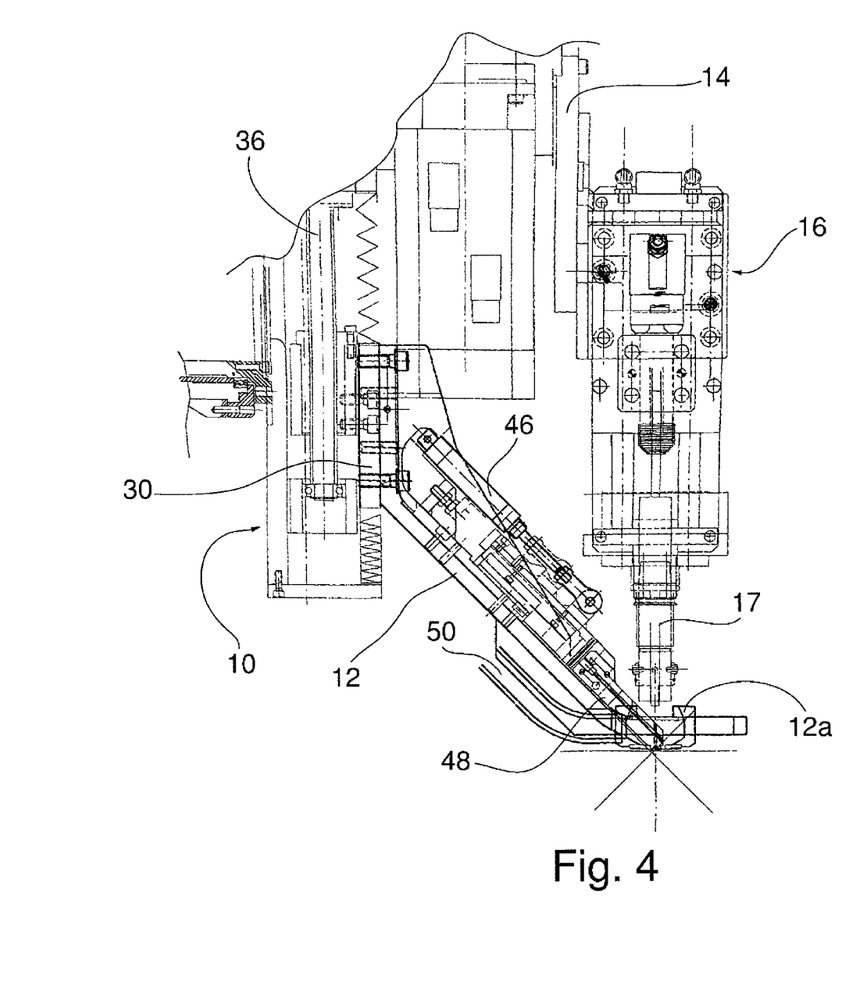
FIG. 4 shows a perspective and partial sectional view of a first point of time of the working of the "barrel" of FIG. 2, according to an embodiment of the present invention.
Figure 5:
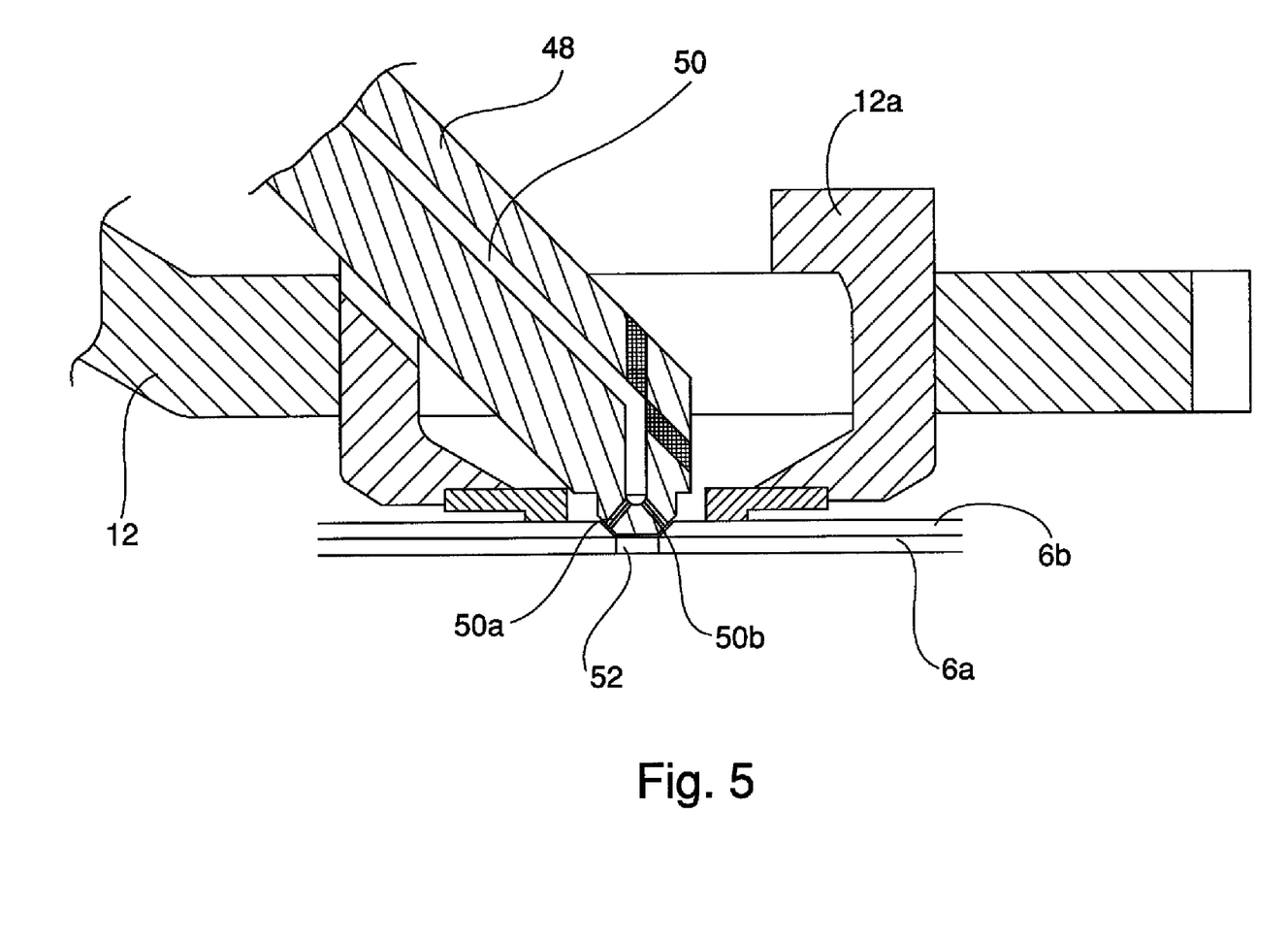
FIG. 5 shows a side view of a second point of time of the working of the "barrel" of FIG. 2, according to the embodiment of the present invention of FIG. 4.

As shown in FIG. 4, in the present embodiment the multiple working riveting head is fixed to the arm of a first Cartesian robot, referred to as "external robot" 43. Such external robot 43 operates in coordination with a second Cartesian robot, referred to as "internal robot" 45 and which holds an internal working head 47, during the phases of drilling, applying the adhesive and riveting.

The internal robot 45 can slide along an internal guide 49, while the external robot 43 can slide along an external guide—not shown—parallel to the internal guide 49.

During the drilling and riveting operations, the internal guide 49 passes through the internal cavity of the tubular shell structure 11, while the external guide of the external robot 43 passes outside the shell structure 11, in a way that the external robot 43 executes the operations from the outside of the tubular shell structure 11, while the internal robot 45 operates at the inside the shell structure 11. On FIG. 4 only one portion of the cylindrical shell structure 11 is shown, while the rest of it is shown in transparency.

The piston head 39 is now described in detail.

Figure 6:
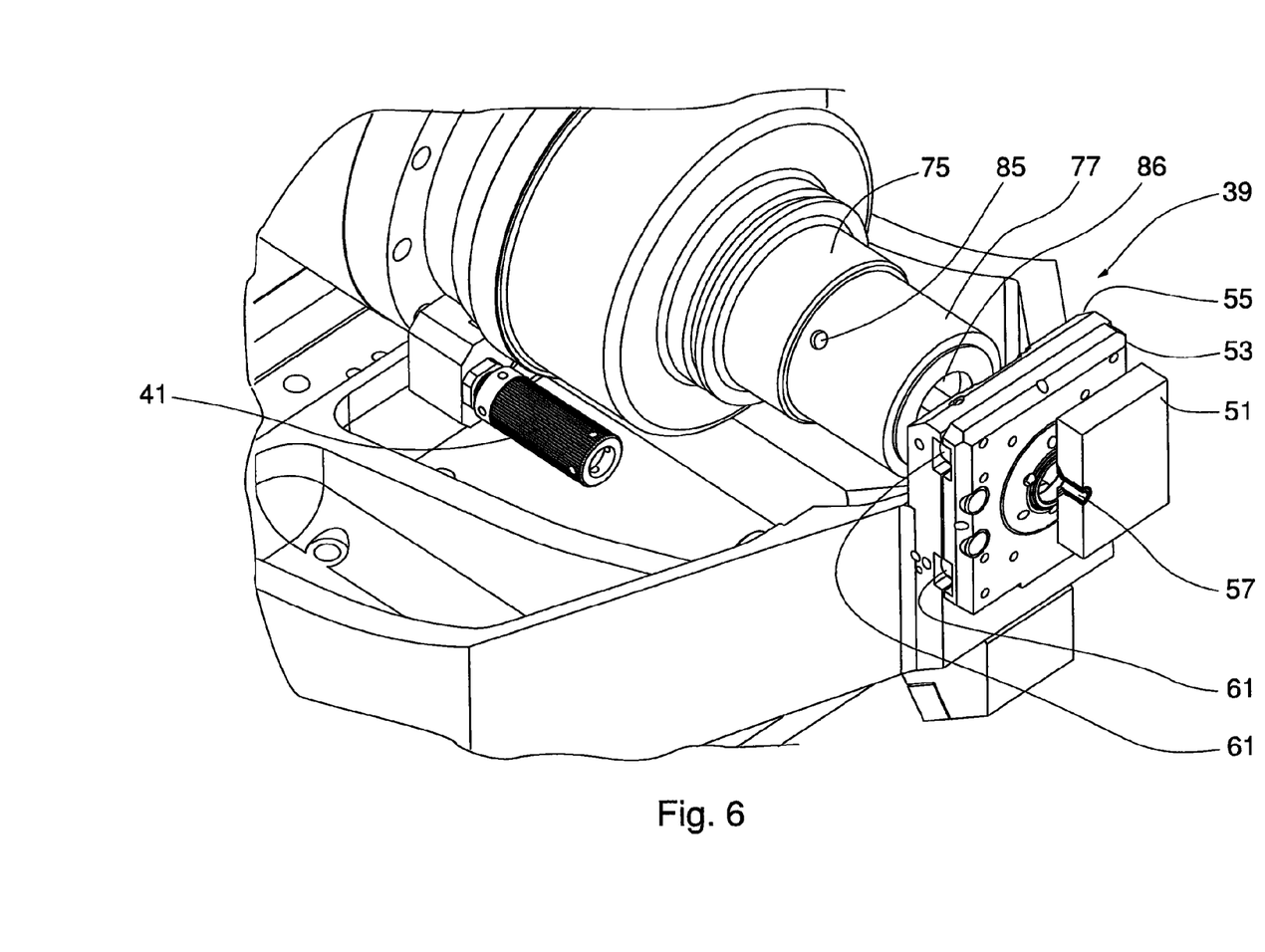
FIG. 6 shows a perspective and partial sectional view of the pressure device and of the drilling device being part of the multiple riveting head of FIG. 3.

The piston head is shown in details on FIG, 6, 7, 7A and comprises a supporting plate 51, and intermediate plate 53, to which the supporting plate 51 is attached, and a fixed base 55 to which the intermediate plate 53 is attached. The supporting plate 51 has a hole or a pass-through aperture 57 (also referred to as a "tool passage opening" 57 in the present description, see FIG. 7), and a suction chamber 81 is arranged inside the intermediate plate 53 and inside the fixed base 55. The tool passage opening 57 and the suction chamber 81 are arranged in such a way that the tool 19—for example a drill bit—can pass through them. The intermediate plate 53 is fixed to the fixed base 55 to as to be able to translate in a direction perpendicular to the fixed base 55 itself, and rotate around rotation axes parallel to the fixed base 55. Furthermore in the present embodiment, four load cells 61 (also referred to as "load detectors 61" in the present description, see FIG. 6) are interposed between the intermediate plate 53 and the fixed base 55; as further detailed later, the load cells 61 detect the thrust that the intermediate plate 53 applies to the fixed base 55 during operation. In other embodiments not shown the load detectors 61, for detecting the thrust applied by the piston head to the shell structure 11 or to other work pieces to be machined, can be present in a different number; for example one, two or three, or more than four load cells can be present.

Figure 7:
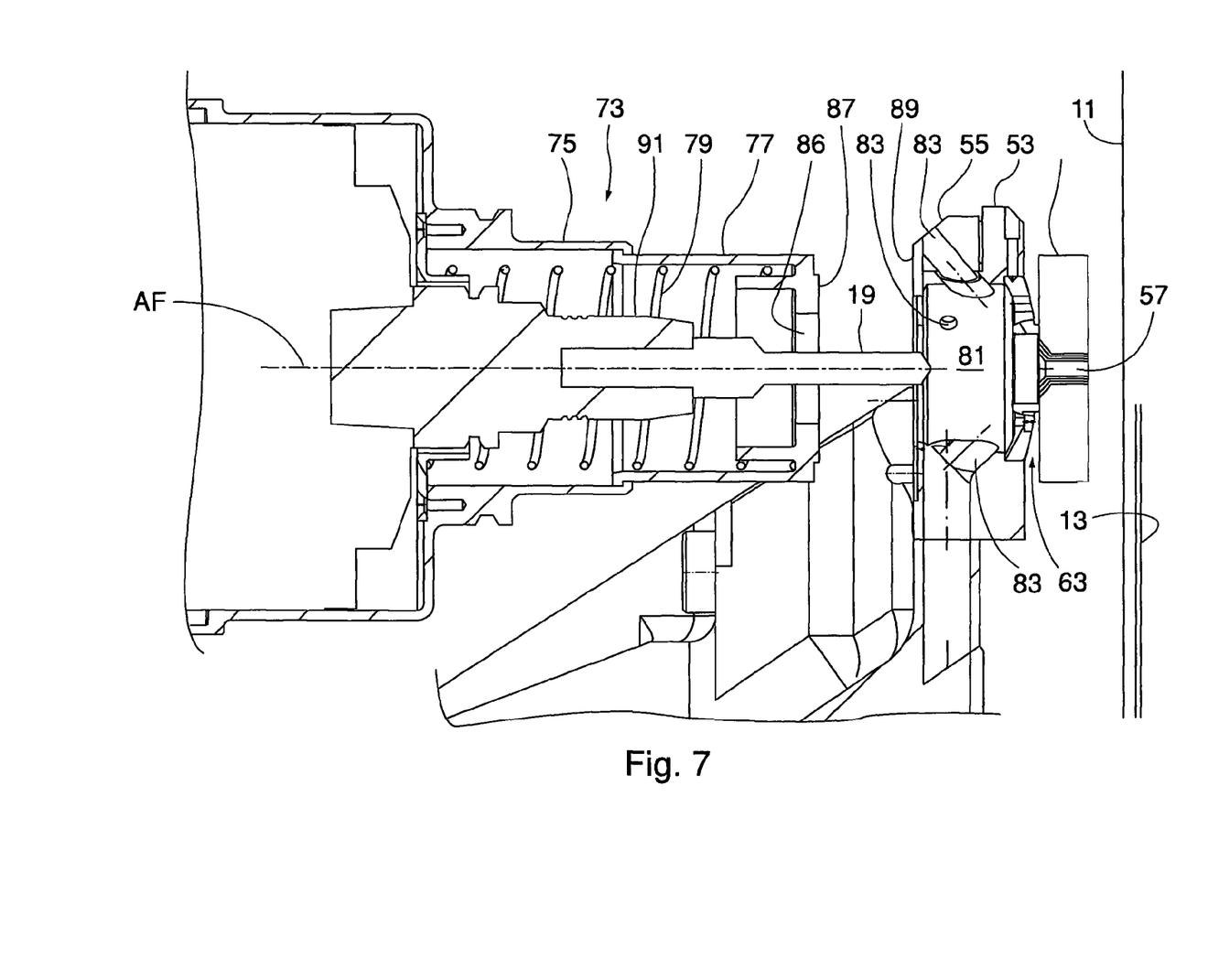
FIG. 7 shows a side and partially sectioned view of a detail of the pressure device and of the drilling device, being part of the multiple riveting head of FIG. 3.
Figure 7A:
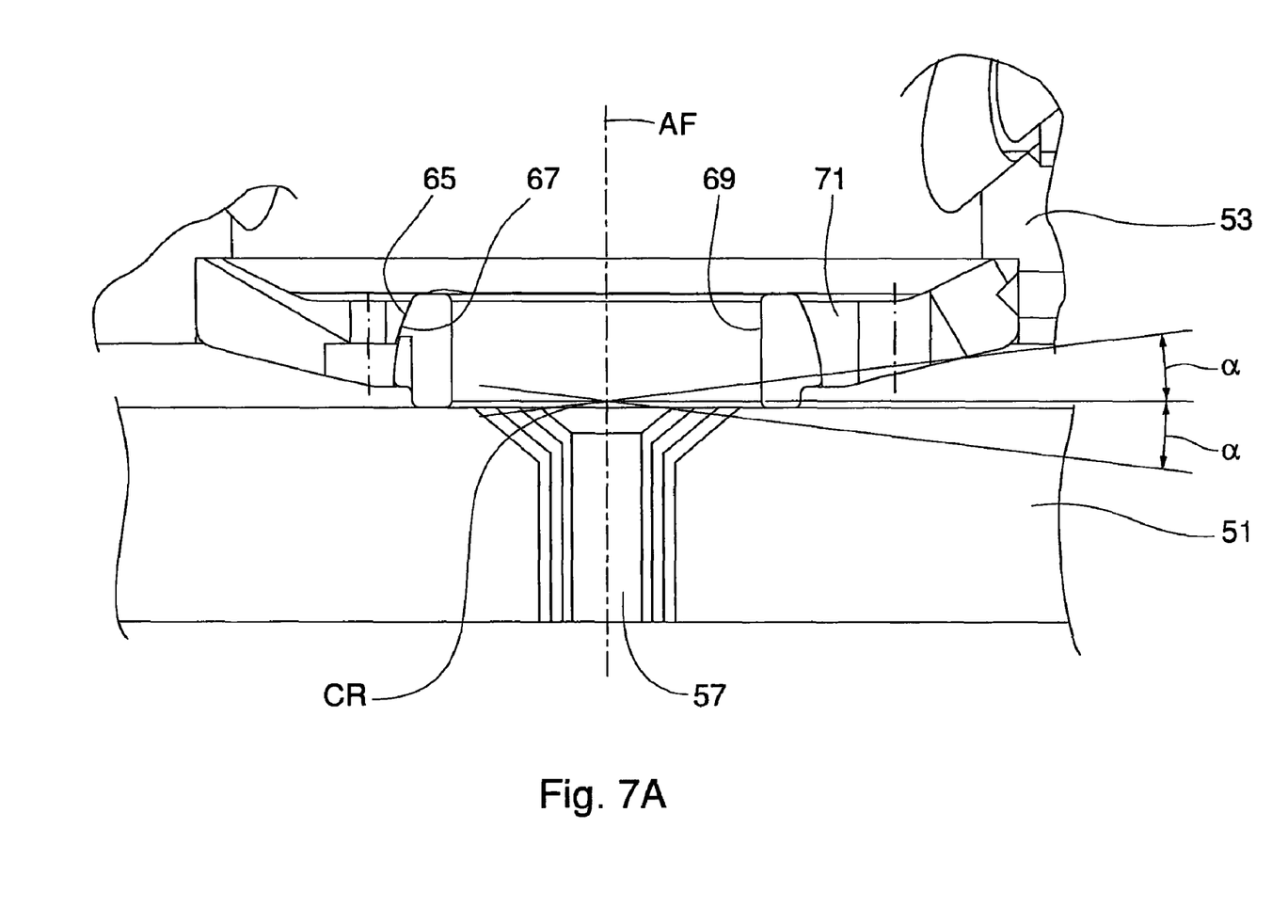
FIG. 7A shows a detail of the view of FIG. 7.

According to a second embodiment of the present invention, the pressure device 25 comprises also a compensating articulated joint 63 connecting the piston head 39 to the rest of the pressure device 25 and allowing it to tilt relative to the rest of the pressure device 25, so as to adjust the piston head 39 to the different possible angles of the work piece relative to the drilling axis AF; such axis AF in the present embodiment coincides with the rotation axis AF of the tool 19 with which the drilling has to be performed (FIGS. 7, 7A).

In the present embodiment, the compensating articulated joint 63 (FIG. 7) comprises a ball joint which in its turn, comprises a portion of a convex spherical surface 65 and a portion of a concave spherical surface 67 housing the portion of the convex spherical surface 65 (FIG. 7A). The portion of the convex spherical surface 65 is made on a ring 69 fixed the supporting plate 51, while the portion of the concave spherical surface 67 is made on the flange 71 fixed to the intermediate plate 53. Preferably, the rotation center CR of the compensating articulated joint 63 lays on the rotation axis AF of the tool 19 with which the drilling operation has to be executed.

Figure 8:
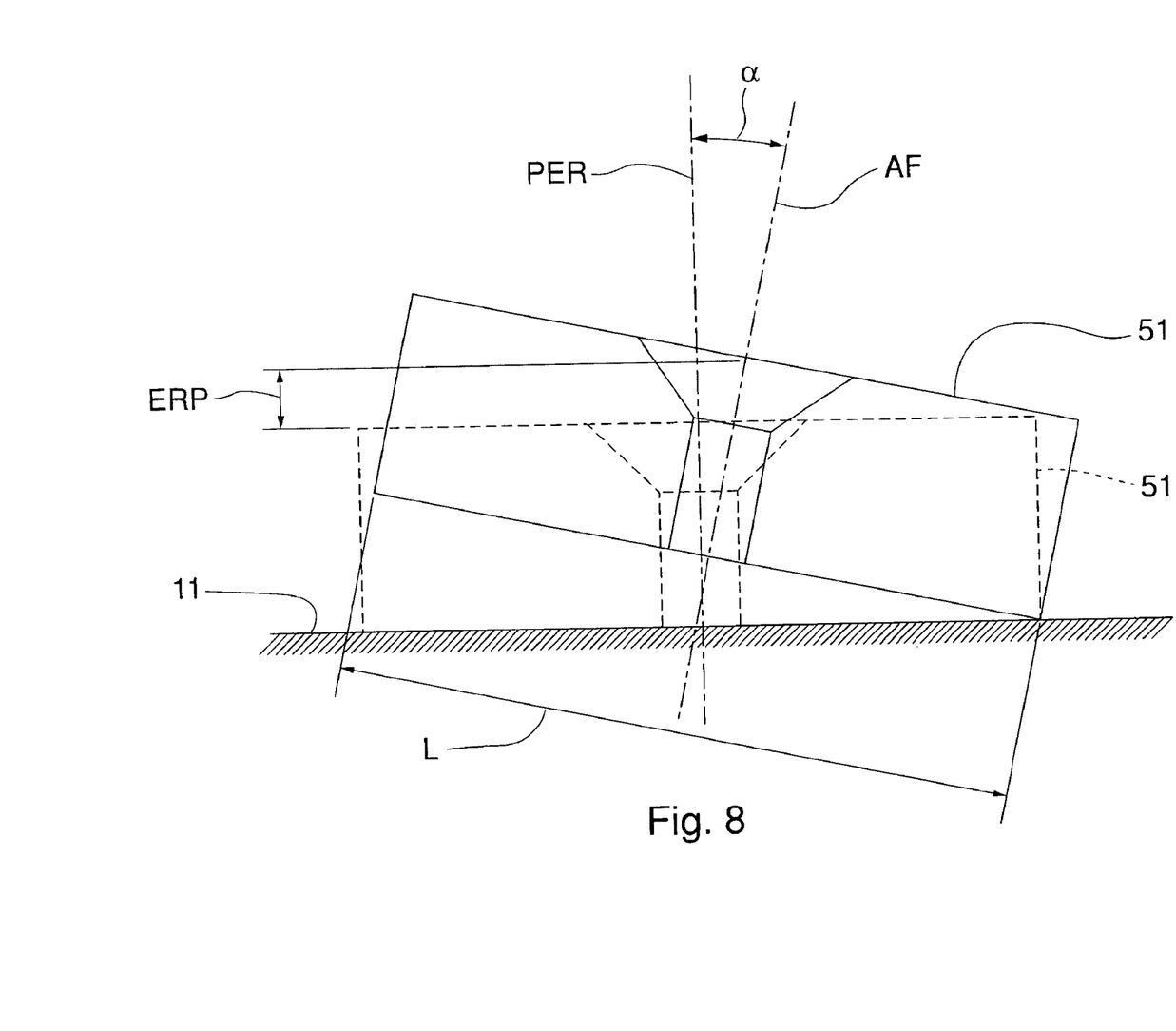
FIG. 8 is a scheme of the operation of the compensating articulated joint of the piston head of the pressure device of FIG. 6.

The functioning of the piston head 39 is the following. In order to drill the wall of the tubular shell structure 11, the external robot 43 brings the supporting plate 51 into contact with the wall of the shell structure 11 while at the same time—as it will be described further in more details—the internal robot 54 brings the internal working head into contact with the same portion of the wall 11, so as to reduce at minimum the deformations of the wall of the shell structure 11 caused by the working head 21. The rotating platform 23 is rotated, and the drilling device 29 is brought at the same position as of the piston head 39. Even though as precise the positioning of the drilling tool with respect of the shell structure 11 can be, the rotation axis AF (FIG. 7) of the drill bit 19 is actually never perfectly perpendicular to the wall of the tubular cylindrical shell structure 11, and most of the times has a perpendicularity error, as indicated in FIG. 8 by the angle α, wherein the axis PER indicates the perpendicular line with respect to the external surface of the shell structure in the drilling area. By resting against the shell structure 11, thanks to the compensating articulated joint 63, the supporting plate 51 coplanar with the wall of the shell structure 11, passing from the position indicated by a continuous line—in which the supporting plate 51 is perpendicular to the drilling axis AF—to the position indicated by the dashed line. The tool 19, in addition to drilling a hole in the wall of the shell structure 11, also needs to also machine a beveled seat, or conical flaring, that will house the conic head 7 of the rivet 1 to be inserted (FIG. 1). In order to prevent the head 7 of the rivet 1 from protruding out of or laying excessively in the conical flaring of the wall of the shell structure 11, causing undesired turbulence of the air flowing over the shell structure 11 during flight, the mechanical tolerances of the depth of the conical flaring must be reduced to a minimum, and ideally to zero. An error in the depth of the conical flaring, due to the perpendicularity error of the drilling axis AF, is schematically indicated in FIG. 8 by the distance ERP. The ball joint of the compensating articulated joint 63 allows to eliminate such error in the depth.

Referring to FIG. 8, the ERP error that the ball joint of the compensating articulated joint 63 allows to eliminate, is equal to $L/2*\sin(\alpha)$, wherein L is the length of the major side of the supporting plate 51.

Returning to the description of the system according to the invention, according to an embodiment said system comprises a containment sleeve 73 (FIG. 6, 7) arranged for housing the tool 19 during the working, and is provided with a second tool passage opening 86, through which the tool 19 can pass and protrude outside. The system further comprises a fluidic circuit arranged for generating a flow of a carrier fluid in the containment sleeve 73 and around the tool 19 during the working, wherein the containment sleeve 73 and the fluidic circuit are arranged for evacuating, by means of the carrier fluid, the possible solid, liquid, gaseous emissions such as shavings, chips, dust, drops, aerosol, fumes or vapors, produced in the tool operating area.

In the present embodiment the containment sleeve 73 comprises two segments having a substantially tubular shape 75, 77 connected to each other so as to form a telescopic sleeve able to reversibly elongate and contract itself. The tubular segment 75 is connected to the body of the drilling device 29. A spiral spring 79, mounted in the containment sleeve itself, by pushing at one end against the body of the drilling device 29 and at the other end against the tubular segment 77, tends to constantly extend the sleeve. The completely extended sleeve is arranged so as to enclose completely the drill bit 19 and eventually the chuck 91 holding the drill bit 19. The chip removal system also comprises a suction chamber 81, as mentioned above (FIG. 7).

In the intermediate plate 53 and in the fixed base 55, the suction ducts 83 are made, leading to the suction chamber 81, and putting the latter in fluidic connection with a vacuum generator, not shown.

The free end 87 of the containment sleeve is shaped so as to mate with the back side 89 of the fixed base 55, keeping to air leakings at a minimum.

The coupling tolerances between the two tubular segments 75, 77 of the suction sleeve, and in particular the external and internal diameters of the segments and the coupling tolerances of their respective ends, allow abundant air leaking into the sleeve during all its operation phases. Sucking an air volume at about the end of the drilling operation, smaller that the amount sucked at the beginning, could be useful; therefore one or more sucking apertures 85, also called additional sucking inlets 85, are provided on the flanks of the tubular segment 75 (FIG. 6).

The functioning of the emission suction system above described, is the following.

During the drilling, the spiral spring 79 keeps the free ends 87 of the containment sleeve constantly pushed against the back side 89 of the fixed base 55. Air—or even other carrier fluids as well—leaks inside through the intakes 85 and through the gaps of the coupling areas between the two tubular segments 75 and 77 due to the vacuum, flows in the sleeve 73 until it reaches the suction chamber 81 and the suction ducts 83; from there, it flows towards the vacuum generator, not shown. In that way, the sucked air flow conveys away and removes chips, shaving, dust, drops, splashes, gas emissions or vapors eventually produced during working from the drilling area, preventing the emissions from penetrating in the possible gaps between the wall of the tubular shell structure 11 and the walls of the added reinforcement rib 13 that is being drilled.

The twist drill 19 as it penetrates inside the wall of the tubular shell structure 11, moves towards the wall of the shell structure 11 causing the tubular segment 77 to progressively recede inside the tubular segment 75 until tubular segment 77 closes one or many sucking inlets 85—depending on whether the sucking inlets 85 are arranged on one and the same, or on multiple axial positions on the tubular segment 75—reducing the air flow sucked into the suction chamber 81.

Figure 9:
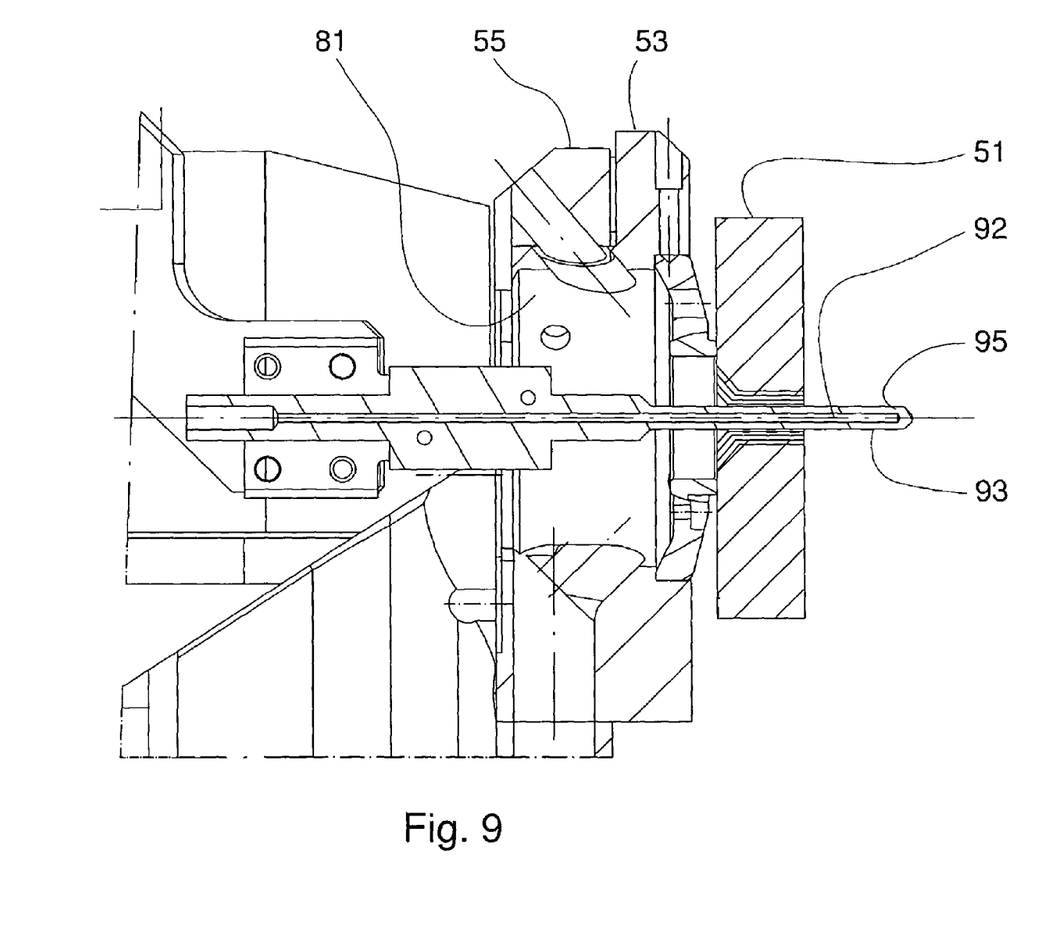
FIG. 9 shows a side and partially sectioned view of a detail of the thickness measuring device of the multiple head of FIG. 3.

Returning to the description of the system according to an embodiment of the present invention, said system comprises a thickness measuring device which in turn comprises a detection rod 93 (FIG. 3, 9). The detection rod 93 in its turn comprises:

an inner duct 92 for allowing a fluid to flow;
a detection hole 95, arranged on a flank of the detection rod and to which the inner duct of the detection rod 93 leads.

The thickness measuring device 31 allows the selection of the most suitable length be selected, of the rivet 11 to be inserted inside the hole according to the particular thickness of the pack made up of the shell structure 11 plus the lip of the added reinforcement rib 13.

In the present embodiment, the detection rod 93 is shaped as a stick having a free end arranged for passing through the tool passage opening 57 of the supporting plate 51, and through the holes made in the wall of the tubular shell structure 11 by the drill bit 19.

The detecting rod 93 is internally hollow, and near its tip has a little hole 95, having an appropriate diameter and referred in the present description as detection hole 95. The inner duct 92 of the detection rod 93 is in fluid communication with a compressed air circuit, not shown or, in other not shown embodiments, with a different kind of pneumatic or fluidic circuit, in which also detection fluid different than the air can be present.

The functioning of the thickness detection system is the following.

The detection rod 93 is progressively inserted in a hole, that the drill bit 19 previously made in the wall of the tubular shell structure 11 and in the added reinforcement rib 13 to be riveted; compressed air is continuously blown from the detection hole 95. When the detection hole 95 is inserted in the hole of the shell structure 11, a pressure variation occurs in the pneumatic circuit feeding the detection rod 93, corresponding to the first axial position of the detection rod 93; in the same way, when the detection hole 95 exits from the other side of the wall of the shell structure 11, a second pressure variation occurs in the pneumatic circuit feeding the detection rod 93, corresponding to a second axial position of the detection rod 93.

An appropriate control system for the controlling the probe, not shown, comprises a logic unit and suitably arranged pressure sensors, for detecting these two pressure variations while at the same time a position sensor detects the two axial positions corresponding to those pressure variations—by measuring, for example, the displacement of the linear—or rotary actuator, which drives the detection rod 93 when the latter is fitted in the hole of the shell structure 11.

The distance between these two axial positions, corresponding to the above-mentioned pressure variations, provides an indication of the total thickness of the pack made up of the shell structure 11 plus the wall of the added reinforcement rib 13, and allows to choose accordingly the rivet 1 having the most suitable length. The fact that air is blown from the small detection hole 95, either compressed air or having a pressure higher than the ambient pressure, cooperates in pushing the detection rod 93 on one side, against the wall of the hole made in the shell structure 11, and this allows a detection rod 93 having a given diameter be used with holes drilled in the walls to be measured, having greatly different diameters.

The overall operation of the drilling-riveting device of FIG. 4 is now described in more details.

After the added reinforcement ribs have been provisionally riveted to the tubular shell structure 11—for example using the method described in the Italian patent application TO2006A000518 of Jul. 14, 2006—wherein the "provisional riveting" or "tacking" can be made for example by attaching an added reinforcement rib 13 to the shell structure 11 in its final position, but using only two rivets, possibly of a different kind than the one used for the final riveting—both the external and the internal robot 43 and 45 reach an area of the shell structure 11 where a rivet 1 needs to be riveted.

A major problem faced when riveting fuselage segments comprising an external shell structure 11 made completely of composite material, is achieving the usually high mechanical precision, typical of the aeronautical manufacturing, in spite of the great deformability of the shell structure.

In a further aspect, the present invention relates also to a method for working a shell structure 11 having a wall with an external side 12, and an internal side 14 opposite to the external side, wherein the method comprises the following steps:
  providing the equipment as previously defined, where the external working head 43 is provided with a load detector 61 arranged for measuring the thrust applied to the shell structure by the external working head 43;
  moving the external working head 21 towards the external side 12 of the wall of the shell structure until a thrust is applied on said external side, equal to the predetermined approaching threshold thrust;
  moving the internal working head 47 towards the internal side 14 of the wall of the shell structure until the load detector 61 does not detect a predetermined variation of the thrust applied by the external working head 21 to the wall of the shell structure;
  by acting on the external working head 21, applying a thrust to the external side 12 of the shell structure in the direction of the thickness, equal to a compression thrust necessary for drilling, and greater than the predetermined approaching threshold thrust.

In the present embodiment, the external robot 43 positions the supporting plate 51 on the outside of the shell structure 11 at a predetermined distance—for example 3 mm—from the wall of the tubular shell structure 11, on the basis of the mathematical model of the tubular shell structure.

Subsequently, the external robot 43 approaches the external face 12 of the wall of the shell structure 11 with a slow motion and stops when the thrust detected by the load detectors 61 (FIG. 6) reaches said contact threshold thrust that, as an indication, can be between 10 and 30 Kgf (in other embodiments, the approaching threshold thrust can have values comprised, for example, between 10 and 60 Kgf, between 10 and 90 Kgf, between 30 and 90 Kgf, between 50 and 90 Kgf).

Subsequently, the external robot is blocked in the position reached, and the logic unit that controls the two robots compares the spatial position in which the wall of the shell structure 11 should have been according to the mathematical model of the shell structure, with the position of the wall of the shell structure 11 in which the external robot has actually reached the approaching threshold; if the difference between the two positions is less than a predetermined admissible maximum error, the working cycle proceeds normally, otherwise the logic unit triggers an alarm causing, for example, an operator to intervene.

It is pointed out that, in the present embodiment, the threshold value of the approaching thrust is empirically determined in a way to
a) pre-load the arm of the external robot and reducing or taking up the slacks of its kinematics chains and
b) not excessively deforming the tubular shell 11.

Subsequently, the arm of the internal robot 45 starts pushing from the inside against the internal side 14 of the wall of the shell structure 11, in the point where the supporting plate 51 of the external robot is positioned, until the load cells 61 of the external robot detect a predetermined load variation grater than a predetermined sensitivity threshold. In the embodiment of FIG. 6, wherein four load cells are mounted on the piston head 39, the logic unit controlling the robots 43 and 45 evaluates the total thrust exchanged between the shell structure 11 and the piston head 39, by calculating a mean of the thrusts detected by the different load detectors 61; in other embodiments, such total thrust can be measured directly or evaluated using other methods.

When a load variation is detected as being greater than such predetermined sensitivity threshold, the internal robot 45 is then firmly blocked in the reached position, and the external robot 43 starts pushing again against the wall of the shell structure 11 until it applies a predetermined thrust to be used during drilling, that is the abovementioned compression force necessary for drilling, which force, as an indication, can be equal to 100 Kgf. In other embodiments, the compression force necessary for drilling can have values comprised for example, between 50 and 150 Kgf.

This second thrust is used for pressing in a pack the wall of the added reinforcement rib 13 together with the wall of the shell structure 11, so as to prevent drilling shavings and chips from penetrate between them.

The above procedure of moving towards and pressing the shell structure allows the tubular shell structure 11 and the added reinforcement rib 13 that needs to be riveted be pre-stressed, by applying a pressure variable in time and reaching predetermined values through two robots 43, 45, even if only one of the robots is provided with pressure sensors. The procedure previously described thus allows the equipment costs be reduced and fully exploiting the capabilities of a robot having more sensors and processing capacity—therefore "more intelligent", by coordinating it with another less "intelligent" robot.

Returning to the general description of the overall operation of the two robots 43, 45, when the external robot 43—with its supporting plate 51—and the internal robot presses in a pack the wall of the shell structure 11 and the wall of the added reinforcement rib 13 using the required compression force, the rotating platform 23 rotates to align the drilling device 29 with the tool passage opening 57 of the piston head 39, and subsequently the drilling device 29 is moved closer to the wall of the shell structure 11 by an actuator, not shown, and drills the shell structure.

Subsequently, the drill bit 19 is removed from the wall of the shell structure 11, the rotating platform 23 rotates again positioning the thickness measuring device 31 in front of the piston head 39; the thickness measuring device 31 which is inserted in the hole drilled in the shell structure 11 and in the added reinforcement rib 13, in order to measure the overall thickness of the drilled wall.

The thickness measuring device 31 is then removed from the hole and the rotating platform 23 rotates again to position one of the two adhesive applicators 33A, 33B, in front of the piston head 39. Another actuator, not shown, positions the adhesive applicator—for example the one referred to as 33A—in front or near of the piston head 39, and the adhesive is injected into and around the hole drilled in the shell structure 11.

The adhesive applicator 33A is then removed from the piston head 39, the rotating platform then rotates once more bringing one of the two units for laying the rivets 35A, 35B, in front of the piston head 39, for example the one referenced 35A, which inserts a rivet in the hole of the shell structure 11 (FIG. 1).

In the shell structure 11, the internal working head 47 inserts a locking bushing 5 on the rivet's stem 1, then pulls the threaded portion of the stem until it shreds and, at the same time, drives the bushing on the stem, completing thereby the riveting phase.

During the drilling, gluing and rivet laying operations, the pressure device 25 and the internal robot 45 apply a constant pressure to the wall of the shell structure 11 and to the added reinforcement rib 13.

The embodiments described above are susceptible of several modifications and variations without departing from the scope of the present invention. For example, the devices and the methods according to the present invention can be used not only for working shell structures 11, but also to for working different kinds of work pieces. The external and internal robots 43 and 45, both of Cartesian type, can be replaced by anthropomorphic robots. The drill bit 19 can be replaced by tools of different kind, for example a milling cutter, a grinding disc, a tool for a generic chip-forming machine, an electrode for spark-discharge machining or electro-plating, a laser—or plasma generator, or an high pressure cutting fluid jet—for example, a nozzle spraying high pressure water for cutting, boring or carving a work piece. The spiral spring 79 can be replaced by a different one able to push the containment sleeve 73 toward its extended configuration. The above mentioned system for evaluating the thickness of a wall of the drilled shell structure 11 can alternatively operate connected to a vacuum circuit or still circuit with an internal pressure t, lower than the atmospheric pressure: in this case, the detecting hole 95 instead of blowing a pressured air jet, sucks external air toward the inner duct 92; the detector of pressure variations however remains arranged for detecting pressure variations occurring inside the fluidic circuit (now under vacuum), and/or inside the inner duct 92, internal to the detection rod 93, when the rod is inserted in or extracted from a hole or other aperture of the wall 11.

The invention claimed is:

1. A working equipment comprising an external working head and an internal working head, both arranged for applying a thrust on a structure having a wall which in turn comprises an external side and an internal side opposite to said external side; said thrust being opposite to the thrust applied to a same part by the other of the internal and external working head,
wherein the external working head is provided with a pressure device comprising a slide which holds a piston head comprising a supporting plate, an intermediate plate and a fixed base, the supporting plate being attached to the intermediate plate and the intermediate plate being attached to the fixed base,
wherein the supporting plate has a tool passage opening,
wherein a suction chamber is arranged inside the intermediate plate and inside the fixed base,
wherein the tool passage opening and the suction chamber are arranged in such a way that a tool with which a drilling operation has to be executed can pass through them,
wherein the intermediate plate is fixed to the fixed base to be able to translate in a direction perpendicular to the fixed base itself, and rotate around rotation axes parallel to said fixed base, wherein a load detector is interposed between the intermediate plate and the fixed base for measuring the thrust applied by the respective one of the internal and external working head on said structure,
wherein said external working head is configured to move towards the external side of the wall of the shell structure, until a thrust is applied to said external side, equal to a predetermined contact threshold thrust;
wherein said internal working head is configure to move towards the internal side of the wall of the shell structure until the load detector detects a predetermined variation of the thrust applied to the wall of the shell structure by the external working head;
the working equipment is configured such that by acting on the external working head, applying to the external side of the shell structure a thrust in the direction of the thickness equal to a compression force necessary for drilling, and greater than the predetermined contact threshold thrust.

2. Working equipment according to claim 1, wherein the internal working head is without a load detector arranged for measuring the thrust applied by the relative work head on the structure.

3. Working equipment according to claim 1, comprising a mechanical arm to which either the external working head or the internal working head is attached, so as to be handled by the mechanical arm.

4. Working equipment according to claim 1, wherein either the external working head or the internal working head is provided with one or more devices chosen from a group comprising: a drilling device, a milling head, a riveting head for applying studs or rivets to the structure, an adhesive applicator for applying a resin or glue to the structure, a pressure device for applying a thrust to the structure during working.

5. Working equipment according to claim 1, comprising a drilling apparatus to drill a structure having a surface to be drilled, wherein the drilling apparatus comprises:
a drilling device arranged for drilling a hole parallel to a drilling axis;
a pressure device mechanically connected to the drilling device and which comprises:

a piston head, wherein the pressure device is arranged for compressing the part to be drilled during the drilling by laying the piston head against the part;

a compensating articulated joint connecting the piston head to the rest of the pressure device and allowing the piston head to tilt with respect to the rest of the pressure device, adapting to possible inclinations of the structure, with respect to the drilling axis.

6. Working equipment according to claim 5, wherein the piston head is arranged substantially in front of the drilling device.

7. Working equipment according to claim 5, wherein the drilling device is provided with a drill tool, arranged to drill the structure, and the piston head is provided with a first tool passage opening through which the tool can pass during the drilling operation in order to reach the structure.

8. Working equipment according to claim 5, wherein the compensating articulated joint comprises a ball joint.

9. Working equipment according to claim 5, wherein the compensating articulated joint is arranged to adapt the inclination of the piston head with respect to the rest of the pressure device by rotating around a rotation center lying over the drilling axis.

10. Working equipment according to claim 5, wherein the drilling device is provided with a beveling tool arranged to make a beveled edge around the mouth of a hole made on the structure.

11. Working equipment according to claim 1, comprising:
a work head arranged to hold a tool;
a containment sleeve arranged to house a tool during working, and provided with a second tool passage opening through which the tool can protrude outside;
a fluidic circuit arranged to generate a flow of carrier fluid in the containment sleeve and around the tool during the working, wherein the containment sleeve and the fluidic circuit are arranged to evacuate, using the carrier fluid, possible solid, liquid or gaseous emissions, such as shaving, chips, dust, drops, aerosol, fumes or vapors generated in the area where the tool operates.

12. Working equipment according to claim 11, wherein the containment sleeve is arranged to extend and reversibly contract itself.

13. Working equipment according to claim 11, wherein the tool comprises one or more of the following components: a twist drill, a milling machine head, a tool for chip-forming machining, a grinding head, a laser generator, an electrode for spark-discharge machining, a plasma generator, a nozzle spraying a high pressure cutting fluid for cutting.

14. Working equipment according to claim 11, wherein the containment sleeve comprises an elastic element which tends to extend the containment sleeve itself.

15. Working equipment according to claim 11, wherein the containment sleeve comprises a plurality of substantially tubular segments forming a telescopic housing, arranged to house internally the tool during working.

16. Working equipment according to claim 15, wherein one of the substantially tubular segments of the containment sleeve has a sucking aperture arranged to cause external air to flow into the containment sleeve and arranged to be closed and/or covered by another one of the substantially tubular segments due to a contraction of the containment sleeve, so as to reduce the air flow passing through the sucking aperture itself.

17. Working equipment according to claim 1 comprising a thickness measuring device comprising a detection rod which in turn comprises:
an inner duct for allowing a fluid to flow;
a detection hole, arranged on a side of the detection rod and to which the inner duct of the detection rod leads.

18. Working equipment according to claim 17, wherein said thickness measuring device comprises an overpressure generator for pumping a detection fluid through the inner duct of the detection rod, and for causing the fluid to flow out of the detection hole.

19. Working equipment according to claim 17, wherein said thickness measuring device comprises a vacuum generator arranged to suck a detection fluid from the outside into the detection rod, through the detection hole and the inner duct of the detection rod.

20. Working equipment according to claim 17, wherein said thickness measuring device comprises:
a fluidic circuit in fluid connection with the inner duct internal to the detection rod;
a pressure variation detector arranged to detect pressure variations occurring in the fluidic circuit and/or in the inner duct internal to the detection rod, whenever the detection rod is inserted in or removed from an aperture in a wall.

21. Working equipment according to claim 20, wherein said thickness measuring device comprises a position detector for detecting the position of the detection rod corresponding to the pressure variations in the fluidic circuit and/or in the inner duct internal to the detection rod, whenever the detection rod is inserted in or removed from an aperture in a wall.

22. Working equipment according to claim 21, wherein said thickness measuring device comprises a logic unit arranged for evaluating the thickness of a wall using informations provided by the pressure variation detector and by the position detector.

23. A method for working a structure having a wall which in turn has an external side and an internal side opposite to the external side, wherein the method comprises the following steps:
providing a working equipment as described in claim 1;
moving the external working head towards the external side of the wall of the structure, until a thrust is applied to said external side, equal to a predetermined contact threshold thrust;
moving the internal working head towards the internal side of the wall of the structure until the load detector detects a predetermined variation of the thrust applied to the wall of the structure by the external working head;
by acting on the external working head, applying to the external side of the wall of the structure a thrust in the direction of the thickness equal to a compression force necessary for drilling, and greater than the predetermined contact threshold thrust.

24. Method according to claim 23, comprising the step of performing one or more of the following working operations while said thrust applied to the structure in the direction of the thickness is equal to the compression force necessary for drilling, in the zone in which the manufacturing operation is performed: drilling, milling, spark-discharge machining, riveting, gluing, grinding, laser cutting, laser drilling, plasma cutting, plasma drilling.

25. Method according to claim 23, comprising the step of blocking the external working head when the external working head applies a thrust to the structure, not lesser than the predetermined contact threshold thrust, the internal working head being blocked before the load detector detects the predetermined variation of the thrust applied to the wall of the structure by the external working head.

26. Method according to claim 23, comprising the step of blocking the internal working head after the load detector has detected the predetermined variation of the thrust applied to the wall of the structure by the external working head.

27. Method according to claim 23 including a drilling operation comprising the following steps:
providing a drilling apparatus to drill a structure having a surface to be drilled, wherein the drilling apparatus comprises:
a drilling device arranged for drilling a hole parallel to a drilling axis;
a pressure device mechanically connected to the drilling device and which comprises:
a piston head, wherein the pressure device is arranged for compressing the part to be drilled during the drilling by laying the piston head against the part;
a compensating articulated joint connecting the piston head to the rest of the pressure device and allowing the piston head to tilt with respect to the rest of the pressure device, adapting to possible inclinations of the structure, with respect to the drilling axis;
bringing the piston head near to the structure according to an approaching direction having a movement component parallel to the drilling axis;
bringing the piston head in contact with the structure in such a way that, due to the compensating articulated joint, the piston head can tilt with respect to the rest of the pressure device adjusting itself to different possible inclinations of the structure with respect to the drilling axis.

28. Method according to claim 23 comprising the following steps:
providing:
a work head arranged to hold a tool;
a containment sleeve arranged to house a tool during working, and provided with a second tool passage opening through which the tool can protrude outside; and
a fluidic circuit arranged to generate a flow of carrier fluid in the containment sleeve and around the tool during working, wherein the containment sleeve and the fluidic circuit are arranged to evacuate, using the carrier fluid, possible solid, liquid or gaseous emissions, such as shaving, chips, dust, drops, aerosol, fumes or vapors generated in the area where the tool operates;
inserting the tool in the containment sleeve;
causing a carrier fluid to flow in the containment sleeve so as to evacuate the solid, liquid, or gaseous emissions that possibly develop in the area where the tool operates on the structure during working.

29. Method according to claim 23, comprising the following steps:
providing a working equipment comprising a thickness measuring device comprising a detection rod which in its turn comprises an inner duct for allowing a fluid to flow and a detection hole, arranged on a side of the detection rod and to which the inner duct of the detection rod leads;
introducing the detection rod in an aperture of a wall to be measured causing detection fluid to flow through the thickness detection rod;
detecting the pressure variations occurring in the fluidic circuit and/or in the inner duct, internal to the thickness detection rod, when the thickness detection rod is inserted in or removed from the aperture of the wall to be measured.

30. Method according to claim 29, comprising the step of expelling detection fluid from the detection hole out of the detection rod when the detection rod is inserted in or removed from the aperture of the wall to be measured.

31. Method according to claim 29 comprising the step of sucking the fluid from outside the detection rod to inside the detection hole when the detection rod is inserted in or removed from the aperture of the wall to be measured.

32. Method according to claim 29 comprising the step of detecting the position of the detection rod corresponding to the pressure variations occurring in the fluidic circuit and/or in the inner duct, internal to the detection rod, when the detection rod itself is inserted in or removed from the aperture of the wall to be measured.

33. Method according to claim 32 comprising the step of evaluating the thickness of the wall to be measured on the basis of the positions of the detecting rod corresponding to the pressure variations occurring in the fluidic circuit and/or in the inner duct of the detection rod when the detection rod is inserted in or removed from the aperture of the wall to be measured.

34. Method according to claim 29, wherein the aperture of the wall to be measured is a pass-through hole, and wherein the method comprises the step of inserting the detection rod inside the aperture of the wall to be measured moving the detecting hole throughout the whole thickness of the wall itself.

* * * * *

UNITED STATES PATENT AND TRADEMARK OFFICE
CERTIFICATE OF CORRECTION

PATENT NO. : 8,201,312 B2
APPLICATION NO. : 11/882506
DATED : June 19, 2012
INVENTOR(S) : Bruno Bisiach Page 1 of 1

It is certified that error appears in the above-identified patent and that said Letters Patent is hereby corrected as shown below:

Title Page, Item (30) should read (30) Foreign Application Priority Data

August 5, 2006 [IT]   Italy.................TO2006A000581

Signed and Sealed this
Twenty-seventh Day of November, 2012

David J. Kappos
*Director of the United States Patent and Trademark Office*